United States Patent
Kim et al.

(10) Patent No.: US 11,935,447 B2
(45) Date of Patent: Mar. 19, 2024

(54) MULTI-DRIVING METHOD OF DISPLAY AND ELECTRONIC DEVICE SUPPORTING SAME

(71) Applicant: SAMSUNG ELECTRONICS CO., LTD., Suwon-si (KR)

(72) Inventors: Seungjin Kim, Suwon-si (KR); Minwoo Lee, Suwon-si (KR); Gwanghui Lee, Suwon-si (KR); Woojun Jung, Suwon-si (KR); Joonyung Park, Suwon-si (KR); Mooyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/091,655

(22) Filed: Dec. 30, 2022

(65) Prior Publication Data

US 2023/0136814 A1 May 4, 2023

Related U.S. Application Data

(63) Continuation of application No. PCT/KR2021/008068, filed on Jun. 28, 2021.

(30) Foreign Application Priority Data

Aug. 4, 2020 (KR) .................. 10-2020-0097226

(51) Int. Cl.
*G06F 3/044* (2006.01)
*G09G 3/00* (2006.01)

(52) U.S. Cl.
CPC ..... *G09G 3/035* (2020.08); *G09G 2310/0221* (2013.01); *G09G 2330/045* (2013.01); *G09G 2360/04* (2013.01)

(58) Field of Classification Search
None
See application file for complete search history.

(56) References Cited

U.S. PATENT DOCUMENTS 7,542,619 B2    6/2009  Toyooka et al.
7,844,128 B2   11/2010  Toyooka et al.
(Continued)

FOREIGN PATENT DOCUMENTS

CN    104238977 A    12/2014
CN    106933526 A     7/2017
(Continued)

OTHER PUBLICATIONS

Communication dated Oct. 19, 2021, issued by the International Searching Authority in counterpart International Application No. PCT/KR2021/008068 (PCT/ISA/210).
Communication dated Oct. 19, 2021, issued by the International Searching Authority in counterpart International Application No. PCT/KR2021/008068 (PCT/ISA/237).

*Primary Examiner* — Carl Adams
(74) *Attorney, Agent, or Firm* — Sughrue Mion, PLLC

(57) ABSTRACT

An electronic device includes a display including a plurality of regions, a display driver integrated circuit configured to drive a first region of the display at a first driving frequency and drive a second region of the display at a second driving frequency according to a configuration of the display, and a processor configured to provide display data to the display driver integrated circuit. The processor identifies a driving frequency of a first screen to be output on the display in response to reception of a first input; and controls the display to output at least a portion of the first screen on a region, of the plurality of regions, driven at a driving frequency corresponding to the driving frequency of the first screen. The display optimizes driving frequency, thus reducing heating problems and resource waste in the electronic device.

17 Claims, 10 Drawing Sheets

(56) References Cited

U.S. PATENT DOCUMENTS

| | | |
|---|---|---|
| 9,418,606 B2 | 8/2016 | You et al. |
| 9,613,554 B2 | 4/2017 | Jang et al. |
| 10,720,114 B2 | 7/2020 | Choi et al. |
| 10,884,692 B2 | 1/2021 | Kim et al. |
| 10,896,655 B2 | 1/2021 | Kim et al. |
| 11,087,718 B2 | 8/2021 | Kim et al. |
| 11,386,852 B2 | 7/2022 | Park et al. |
| 2009/0315876 A1 | 12/2009 | Ichikawa et al. |
| 2013/0293529 A1 | 11/2013 | You et al. |
| 2014/0085276 A1 | 3/2014 | Jang et al. |
| 2015/0243202 A1* | 8/2015 | Lombardi ............. G06F 1/1616 345/520 |
| 2016/0240154 A1* | 8/2016 | Forutanpour ........ G09G 3/3644 |
| 2017/0255442 A1 | 9/2017 | Kim et al. |
| 2018/0061356 A1 | 3/2018 | Tada et al. |
| 2019/0057661 A1 | 2/2019 | Choi et al. |
| 2019/0206367 A1 | 7/2019 | Kim et al. |
| 2019/0213971 A1 | 7/2019 | Kim et al. |
| 2020/0008142 A1 | 1/2020 | Peng et al. |
| 2021/0027720 A1 | 1/2021 | Park et al. |
| 2021/0035488 A1 | 2/2021 | Seo et al. |
| 2021/0124548 A1 | 4/2021 | Kim et al. |

FOREIGN PATENT DOCUMENTS

| | | |
|---|---|---|
| CN | 106933527 A | 7/2017 |
| CN | 107665105 A | 2/2018 |
| JP | 1-280790 A | 11/1989 |
| JP | 2006-84758 A | 3/2006 |
| JP | 2006-259689 A | 9/2006 |
| JP | 2010-2576 A | 1/2010 |
| JP | 2017-135612 A | 8/2017 |
| JP | 2018-31855 A | 3/2018 |
| KR | 10-2014-0039524 A | 4/2014 |
| KR | 10-2016-0070445 A | 6/2016 |
| KR | 10-2017-0059149 A | 5/2017 |
| KR | 10-2017-0102634 A | 9/2017 |
| KR | 10-2018-0022211 A | 3/2018 |
| KR | 10-2019-0085200 A | 7/2019 |
| KR | 10-2021-0013475 A | 2/2021 |
| KR | 10-2021-0014259 A | 2/2021 |
| KR | 10-2021-0082702 A | 7/2021 |
| KR | 10-2021-0085629 A | 7/2021 |

\* cited by examiner

MULTI-DRIVING METHOD OF DISPLAY AND ELECTRONIC DEVICE SUPPORTING SAME

CROSS-REFERENCE TO RELATED APPLICATIONS

This application is a bypass continuation application of International Patent Application PCT/KR2021/008068, filed on Jun. 28, 2021, which claims priority to Korean Patent Application No. 10-2020-0097226, filed on Aug. 4, 2020 in the Korean Intellectual Property Office, the disclosures of which are incorporated by reference herein in their entireties.

BACKGROUND

1. Field

The disclosure relates to multi-driving of a display, and more particularly, to driving of a display having a plurality of regions operating at different frequencies, such that execution screens are selectively output to different regions in accordance with the driving frequencies.

2. Description of Related Art

A conventional electronic device including a display may output a screen according to the running of an application on the display. The screen output on the display may be driven at a driving frequency specified according to settings. Furthermore, the conventional electronic device may output a plurality of execution screens on divided display regions depending on the running of a plurality of applications or may output a plurality of execution screens based on a pop-up mode.

When a plurality of application execution screens are output, they may be driven based on the highest driving frequency among driving frequencies of the execution screens. Thus, as a conventional electronic device operates a display based on an overall high driving frequency, although there is an execution screen capable of operating at a relatively low driving frequency, unnecessary heating may occur and a waste of resources may occur. In addition, an electronic device having a scalable display such as a foldable device or a rollable device may cause a more serious heating problem and a resource waste problem.

SUMMARY

Herein, a driving frequency at which the plurality of execution screens are driven may be determined by a driving frequency of a specific application.

Provided are a multi-driving method of a display for operating a driving frequency optimized for each execution screen in a situation where a plurality of execution screens are output on the display and an electronic device supporting the same.

Further provided are a multi-driving method of a display for driving an expanded display at optimized driving frequencies, in an electronic device having a scalable display, and an electronic device supporting the same.

Further provided are a multi-driving method of a display for driving a plurality of displays at optimized driving frequencies, in an electronic device having the plurality of displays, and an electronic device supporting the same.

In accordance with certain embodiments of the disclosure, an electronic device is provided. The electronic device may include a display which includes a plurality of regions, a display driver integrated circuit that drives a first region of the plurality of regions at a first driving frequency and drives a second region of the plurality of regions at a second driving frequency according to a configuration of the display, and a processor that provides display data to the display driver integrated circuit. The processor may be configured to identify a driving frequency of a first screen to be output on the display in response to reception of a first input, and to control the display to output at least a portion of the first screen on a region, of the plurality of regions, driven at a driving frequency corresponding to the driving frequency of the first screen.

The processor may be further configured to identify an application to be executed in response to the first input, and to output the first screen on the first region based on execution of the application when the application is configured to operate at the first driving frequency.

The processor may be further configured to identify an application to be executed in response to the first input, and to output the first screen on the second region based on execution of the application when the application is configured to operate at the second driving frequency.

The processor may be further configured to identify a size of the first screen to be output on the display, to select a region of the plurality of regions corresponding to the size of the first screen, when a size of the region driven at the driving frequency corresponding to the driving frequency of the first screen is different from the size of the first screen, and to change a driving frequency of the selected region based on the driving frequency of the first screen.

The processor may be further configured to identify a size of the first screen to be output on the display, and to output the first screen over the first region and the second region, when the size of the first screen is greater than a size of each of the first region and the second region, and output the first screen at a driving frequency greater than the driving frequency of each of the first region and the second region.

The processor may be further configured to identify a size of the first screen to be output on the display, to output the first screen over the first region and the second region, when the size of the first screen is greater than a size of each of the first region and the second region, and to change driving frequencies of the first region and the second region over which the first screen is output, based on the driving frequency of the first screen.

The processor may be further configured to execute a first application in response to the first input, to output the first screen on the first region based on the execution of the first application, to execute a second application in response to a second input, when the second input is received, and to drive the second region at the second driving frequency while outputting a second screen on the second region based on the execution of the second application.

The processor may be further configured to execute a first application in response to the first input, to output the first screen on the first region based on the execution of the first application, to execute a second application in response to a second input, when the second input is received, and to drive the first region at the first driving frequency while overlaying and outputting a second screen on the first region based on the execution of the second application over at least a portion of the first screen.

The processor may be further configured to execute a first application in response to the first input, and to output the first screen according to the running of the first application over the first region and the second region.

The processor may be further configured to receive a second input, to run a second application in response to the second input, to drive the first region at the first driving frequency, while overlaying and outputting a second screen according to the running of the second application on a portion of the first screen of the first region, and to change a driving frequency of the second region to the first driving frequency, while adjusting a size of the first screen and outputting the first screen on the second region.

The processor may be further configured to execute a first application in response to the first input, to output the first screen over the first region and the second region based on the execution of the first application, to execute a second application in response to reception of a second input, when the second input is received, and to drive the second region at the second driving frequency, while overlaying and outputting a second screen on the first region based on the execution of the second application over a portion of the first screen in the second region.

The processor may be further configured to drive the first region at the first driving frequency, while adjusting a size of the first screen and outputting the first screen on the first region.

The electronic device may further include a first housing in which a first part of the display is located, a second housing in which a second part of the display is located, and a hinge structure connecting the first housing with the second housing. The first region of the display may correspond to at least the first part of the display, and the second region of the display may correspond to at least the second part of the display.

The electronic device may further include a sliding structure associated with extension of the display. The first region may include at least a portion of a region which is observable before a sliding operation of the sliding structure, and the second region may include at least a portion of a region which is expanded to be observable by the sliding operation of the sliding structure.

The electronic device may further include a rollable structure associated with extension of the display. The first region may include at least a portion of a region which is observable before a display rolling operation of the rollable structure, and the second region may include at least a portion of a region which is expanded to be observable by the display rolling operation of the rollable structure.

One or more embodiments may drive each of a plurality of execution screens to be output on a display at an optimized driving frequency, thus reducing a waste of resources of the electronic device and solving a heating problem.

In addition, other effects of the disclosure may be exemplified together with a detailed description of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
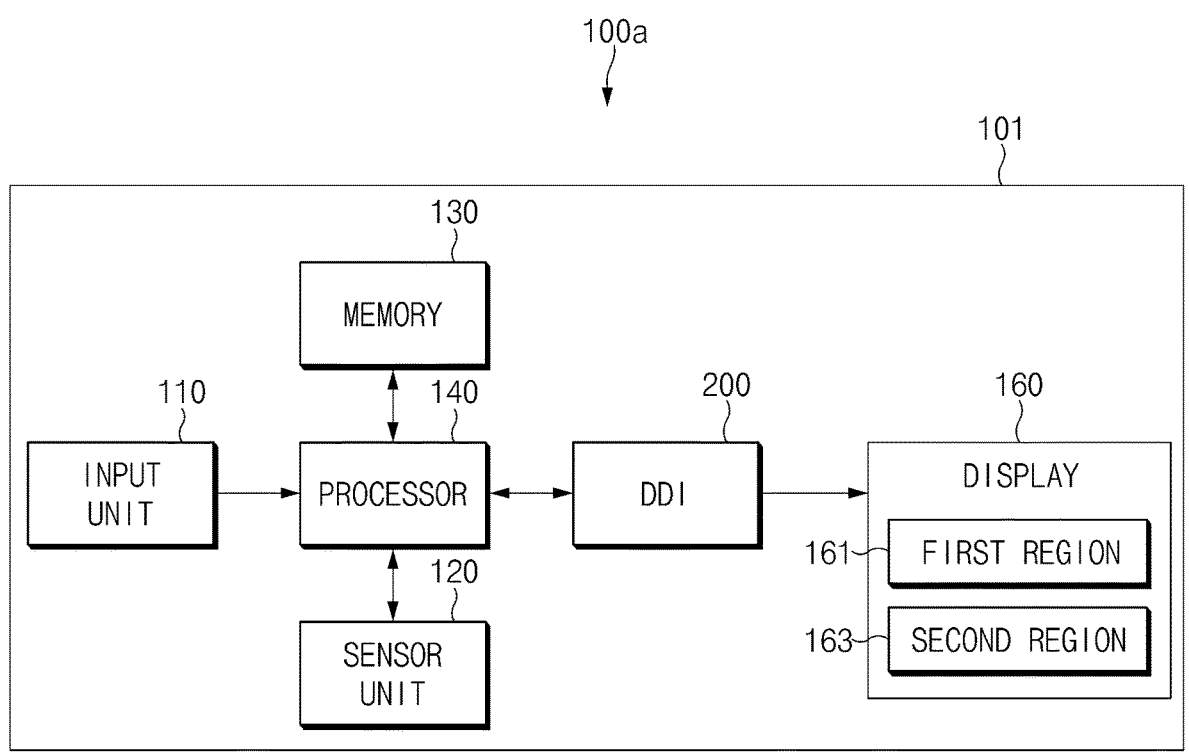
FIG. 1 is a diagram schematically illustrating an example configuration of an electronic device according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop personal computers, laptop personal computers, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyro-compasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a diagram schematically illustrating an example configuration of an electronic device according to an embodiment.

Referring to FIG. 1, an electronic device 100*a* according to an embodiment may include an input unit 110, a sensor unit 120, a memory 130, a processor 140, a display driver IC (DDI) 200, and a display 160. The electronic device 100*a* may include a housing 101 in which at least some of the above-mentioned components are received. In the electronic device 100*a*, the sensor unit 120 may be selectively included or omitted. According to various embodiments, when supporting a communication function, the electronic device 100*a* may further include at least one communication processor associated with operation of the communication function and at least one antenna.

According to an embodiment, the input unit 110 may receive a user input and may deliver the received user input to the processor 140. The input unit 110 may include at least one of, for example, a touch screen, a physical button, a touch pad, an electronic pen, a voice input (e.g., a microphone). The input unit 110 may further include a camera. A user may generate a user input by taking a specified gesture using the camera. According to an embodiment, the input unit 110 may receive a user input requesting to run at least one application, such that the application is to be executed in response to the user input. In this regard, the display 160 may output an icon or a menu associated with running the at least one application. The user may select an icon or a menu by means of the input unit 110 or the display 160 having a touch screen function to request to run a specific application. The input unit 110 may include a function of receiving a specified user utterance associated with requesting to run the application. In this case, the input unit 110 may include a microphone as a component. According to various embodiments, the input unit 110 may include the sensor unit 120.

According to an embodiment, the input unit 110 may further include an angle sensor (e.g., the angle sensor detects an angle to correspond to a luminance change according to opening and closing, when the electronic device is a foldable electronic device), a motion sensor, a biometric sensor, or an optical sensor. The input unit 110 may receive an input corresponding to outputting a plurality of execution screens.

According to an embodiment, the memory 130 may store various data and programs associated with operation of the electronic device 100a. For example, the memory 130 may store an operation program associated with operation of the electronic device 100a, a program associated qwith operation of the sensor unit 120, a plurality of applications, a plurality of execution screens according to running of the plurality of applications, driving frequency setting information of each application, or driving frequency information for each of a plurality of regions of the display 160.

According to an embodiment, the processor 140 may be operationally connected with the input unit 110, the sensor unit 120, the memory 130, and the DDI 200. The processor 140 may deliver data necessary for driving of the display 160 to the DDI 200, in conjunction with execution of the program or the application stored in the memory 130. According to an embodiment, the processor 140 may deliver driving frequency information for each of a plurality of regions of the display 160 to the DDI 200. Alternatively, the processor 140 may deliver display data corresponding to an execution screen of at least one application to be output on the display 160 and driving frequency information of the execution screen to the DDI 200.

According to an embodiment, the display 160 may display display data by means of the DDI 200. According to an embodiment, the display 160 may be implemented as a thin film transistor-liquid crystal display (TFT-LCD) panel, a light emitting diode (LED) display panel, an organic LED (OLED) display panel, an active-matrix OLED (AMOLED) display panel, or a flexible display panel.

According to an embodiment, the display 160 may include, for example, a gate driver (or a circuit, an IC, or an integrated chip), gate lines, a source driver (or a circuit or an IC), and source lines arranged to cross the gate lines in the form of a matrix. Gate signals may be supplied to the gate lines. According to an embodiment, the gate signals may be sequentially supplied to the gate lines. According to various embodiments, a first gate signal may be supplied to odd-numbered gate lines among the gate lines, and a second gate signal may be supplied to even-numbered gate lines among the gate lines. The first gate signal and the second gate signal may include signals which are alternately supplied. Alternatively, after the first gate signal is sequentially supplied from a start line of the odd-numbered gate lines to an end line of the odd-numbered gate lines, the second gate signal may be sequentially supplied from a start line of the even-numbered gate lines to an end line of the even-numbered gate lines. A signal corresponding to the display data may be supplied to the source lines. The signal corresponding to the display data may be supplied from the source driver under control of a timing controller of a logic circuit.

According to an embodiment, the display 160 may include light emitting elements, in which a plurality of gate lines and a plurality of source lines are arranged in the form of a matrix, which are connected with a plurality of thin filter transistors (TFTs). An execution screen according to the running of the application or content screen may be displayed on the display 160. In this operation, the display 160 may output an execution screen depending on operation of a driving frequency of the DDI 200. According to various embodiments, the display 160 may include a plurality of regions; for example, a first region 161 on which a first content screen is displayed and a second region 163 on which a second content screen is displayed. The first content screen and the second content screen may include execution screens according to a running (e.g an execution) of applications, respectively. Alternatively, the first content screen and the second content screen may include a plurality of content screens executed according to a running of one application. While first content is displayed on the first region 161, the first content screen may be displayed based on a first driving frequency (e.g., 60 Hz). While second content is displayed on the second region 163, the second content screen may be displayed based on a second driving frequency (e.g., 120 Hz). As described above, the first region 161 and the second region 163 of the display 160 may be driven at different frequencies. In this regard, the display 160 may be configured with hardware to be driven at a different driving frequency for each region 161 or 163.

According to an embodiment, when the electronic device 100a is a rollable display device, it may further include a rollable structure associated with extension of the display 160 and the first region 161 of the display 160 may be a region which is observable to a user before a separate rolling operation is performed. The second region 163 of the display 160 may include a display region which is expanded from the rolling operation to be observable to a user. According to various embodiments, when the electronic device 100a is a slidable display device, it may further include a sliding structure associated with extension of the display 160 and the first region 161 of the display 160 may be a region which is observable to a user before a separate sliding operation is performed. The second region 163 of the display 160 may include a display region which is expanded from the sliding operation to be observable to a user.

According to an embodiment, the first region 161 of the display 160 may include, for example, a region which outputs an execution screen set to be displayed based on the first driving frequency. According to an embodiment, the second region 163 of the display 160 may include, for example, a region which outputs an execution screen set to be displayed based on the second driving frequency different from the first driving frequency. Alternatively, the first region 161 and the second region 163 of the display 160 may include a region which outputs an execution screen set to be displayed based on any one of the first driving frequency or the second driving frequency depending on settings or a type of an application.

According to an embodiment, the housing 101 may have a space in which at least some of components of the electronic device 100a, for example, the memory 130, the processor 140, and the DDI 200 may be received and may have a space in which at least a portion of at least one of the input unit 110, the sensor unit 120, or the display 160. According to an embodiment, the housing 101 may be variously formed according to the type of the electronic device 100a. For example, when the electronic device 100a is the rollable display device, the housing 101 may include a space and a component in which the display 160 may be rolled. According to various embodiments, when the electronic device 100a is the slidable display device, the housing 101 may include a space and a component in which the display 160 may be expanded according to a sliding operation.

According to an embodiment, the DDI 200 may change display data transmitted from the processor 140 into a format capable of being transmitted to the display 160 and may transmit the changed data to the display 160. The changed data (or the display data) may be supplied on a pixel-by-pixel basis (or on a subpixel-by-subpixel basis). Herein, a pixel may have a structure in which subpixels Red, Green, and Blue are arranged adjacent to each other, in conjunction with displaying a specified color. One pixel may include RGB subpixels (RGB stripe layout structure) or may include RGBG subpixels (Pentile layout structure). Herein, an arrangement structure of the RGBG subpixels may be replaced with an arrangement structure of RGGB subpixels. Alternatively, the pixel may be replaced with an arrangement structure of RGBW subpixels. According to an embodiment, the DDI 200 may determine a different driving frequency for each region 161 or 163 of the display 160 depending on at least one of a type of content requested to be played (or application information) and a user setting.

As described above, the electronic device 100a according to an embodiment may differently drive a driving frequency (e.g., a refresh rate (R/R)) of the display 160 for each region 161 or 163, thus assisting in operating a driving frequency optimized for the corresponding content screen. Thus, a frame drop, an increase in current consumption, occurrence of a judder (a frame shake), which are generated due to operation of a driving frequency which does not suitable for an application execution screen or a content execution screen, may be suppressed. Meanwhile, the case where the display 160 includes the two regions (the first region 161 and the second region 163) driven at the different driving frequencies is exemplified in the above-mentioned description, but the disclosure is not limited thereto. For example, the display 160 may include two or more of a plurality of regions capable of being driven at different driving frequencies, and at least some of the plurality of regions may be activated or deactivated according to a rolling operation or a sliding operation of the electronic device 100a.

Figure 2:
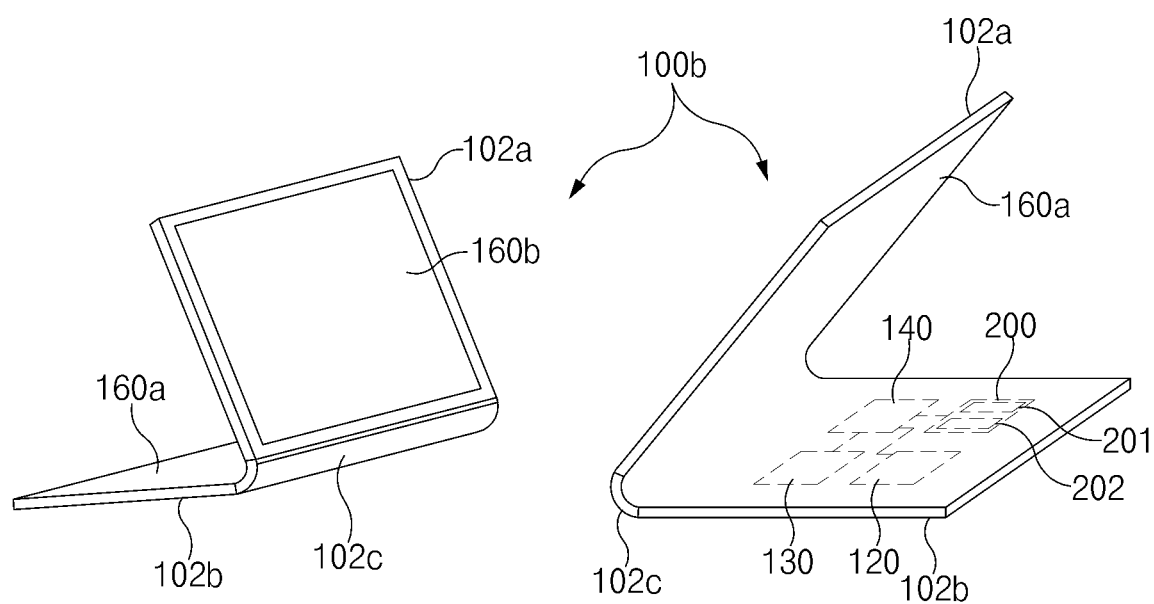
FIG. 2 is a diagram schematically illustrating another example configuration of an electronic device according to an embodiment.

FIG. 2 is a diagram schematically illustrating another example of a configuration of an electronic device according to an embodiment.

Referring to FIG. 2, an electronic device 100b according to an embodiment may include an input unit 110 (not depicted in FIG. 2), a sensor unit 120, a memory 130, a processor 140, a display driver IC (DDI) 200, and a plurality of displays 160a and 160b. According to various embodiments, the electronic device 100b may include a plurality of housings 102a and 102b associated with at least some of the above-mentioned components and a hinge structure 102c. The configuration of the input unit 110 and the sensor unit 120 in the above-mentioned configuration of the electronic device 100b may include the same or similar configuration to the configuration of the electronic device 100a, which is described above. According to various embodiments, when supporting a communication function, the electronic device 100b may further include at least one communication processor associated with operation of the communication function and at least one antenna.

According to an embodiment, the plurality of displays 160a and 160b may include the first display 160a and the second display 160b. A first part of the first display 160a may be located on a first surface of the first housing 102a, and a second part of the first display 160a (which may be the remainder of the first display 160a) may be located on a first surface of the second housing 102b. The first display 160a may be folded inward when the first housing 102a and the second housing 102b rotate based on the hinge structure 102c. At least a part of the second display 160b may be disposed on a second surface (e.g., a surface opposite to the first surface) of the first housing 102a. The electronic device 100b may further include a hinge housing which covers the hinge structure 102c.

According to an embodiment, the memory 130 may store at least one program or application associated with operation of the electronic device 100b. Furthermore, the memory 130 may include information associated with driving the first display 160a and information associated with driving the second display 160b. At least one of the first display 160a and the second display 160b may include a first region 161 and a second region 163, which are driven at different driving frequencies, as described above in FIG. 1.

According to an embodiment, the processor 140 may activate at least one of the first display 160a or the second display 160b depending to a folded or flat state of the electronic device 100b. For example, when the disposition state of the electronic device 100b changes from the folded state to the flat state, the processor 140 may activate the first display 160a and may output an execution screen according to running of a specified application at a first driving frequency. According to various embodiments, when the disposition state of the electronic device 100b changes from the flat state to the folded state, the processor 140 may activate the second display 160b and may output an execution screen according to the running of the specified application at a second driving frequency. Alternatively, in the folded state of the electronic device 100b, the processor 140 may activate the second display 160b depending on an input signal input from the input unit 110 (e.g., a physical button or a turn-on/turn-off button disposed on at least some of the housings 102a and 102b). While outputting the execution screen (e.g., a waiting screen) of the specified application depending on the input signal, the second display 160b may drive the output execution screen at the second driving frequency (or the first driving frequency). According to various embodiments, while outputting a first content screen at the first driving frequency on the second display 160b when the disposition state of the electronic device 100b is the folded state, when the disposition state of the electronic device 100b changes to the flat state, the processor 140 may activate the first display 160a while deactivating the second display 160b and may output the first content screen on the first display 160a. In this operation, the first content screen output on the first display 160a may be driven at any one of the first driving frequency or the second driving frequency according to settings (or a type of an application).

According to an embodiment, the DDI 200 may drive the first display 160a and the second display 160b under control of the processor 140. According to various embodiments, the DDI 200 may include a first DDI 201 for driving the first display 160a and a second DDI 202 for driving the second display 160b. The first DDI 201 and the second DDI 202 may drive the first display 160a and the second display 160b at a specified driving frequency (e.g., the first driving frequency or the second driving frequency) under control of the processor 140.

Meanwhile, the case where the electronic device 100b includes the first display 160a and the second display 160b is described in the above-mentioned description, but the disclosure is not limited thereto. For example, the electronic device 100b may include two or more of a plurality of displays and may include a plurality of DDIs for driving the respective displays.

Figure 3:
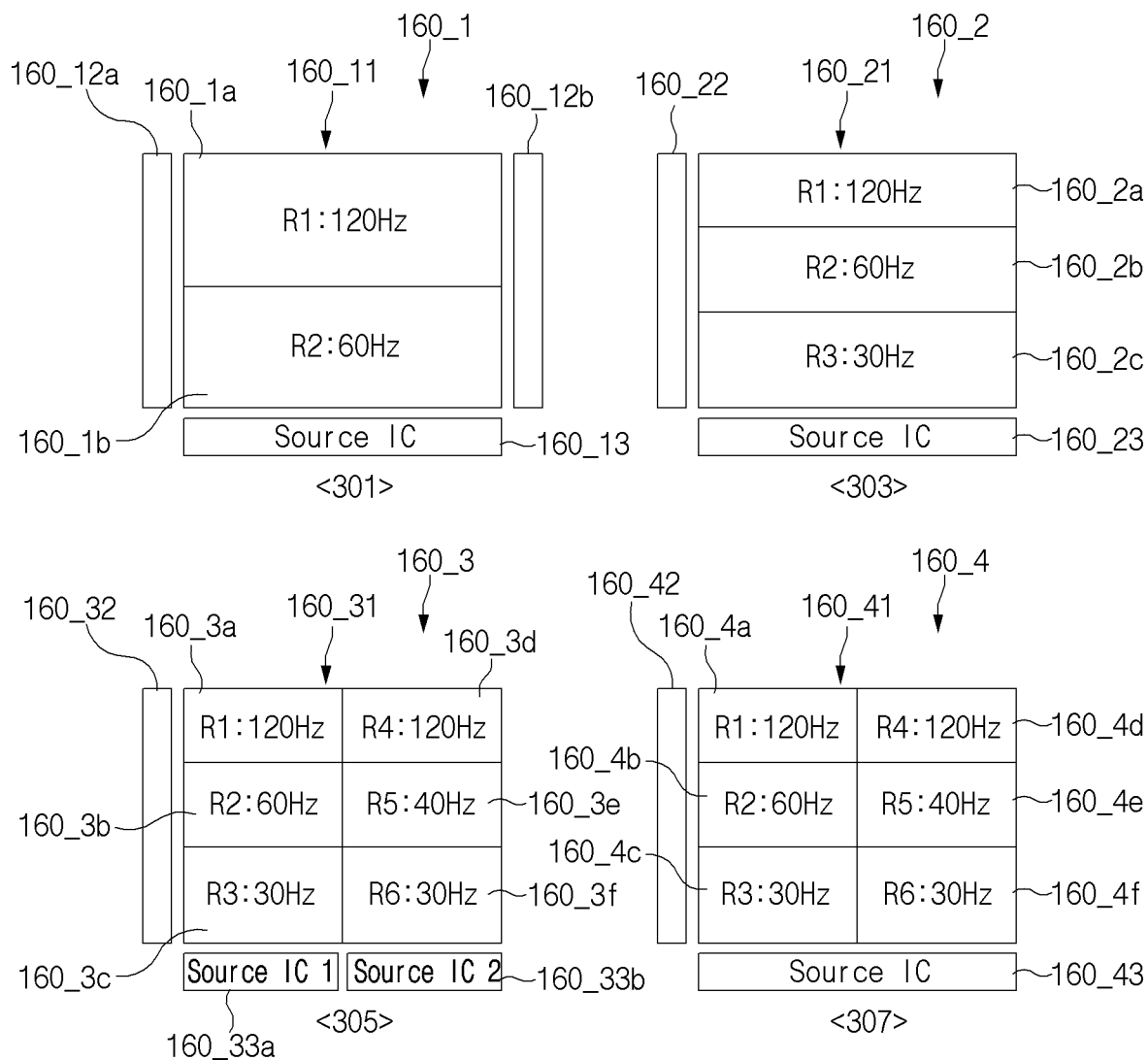
FIG. 3 is a diagram illustrating various examples of a display structure of an electronic device according to an embodiment.

FIG. 3 is a diagram illustrating various examples of a display structure of an electronic device according to an embodiment.

Referring to FIG. 3, as in 301, a first type display 160_1 according to an embodiment may include a display panel 160_11 which operates in a first driving frequency region 160_1a and a second driving frequency region 160_1b, a first gate driver 160_12a (or a gate shift register) which supplies a gate signal to the display panel 160_11, a second gate driver 160_12b, and a source driver 160_13. The first driving frequency region 160_1a may be, for example, a region set to drive at 120 Hz or may include a region which outputs an execution screen of an application which drives at a driving frequency of 120 Hz. The second driving frequency region 160_1b may be, for example, a region set to drive at 60 Hz or may include a region which outputs an execution screen of an application which drives at a driving frequency of 60 Hz. According to an embodiment, when the running or execution of an application is requested, the processor 140 may identify setting or configuration information of the application to identify a driving frequency of an execution screen of the application and may control the display 160_1 to output the execution screen on the first driving frequency region 160_1a when the driving frequency is 120 Hz, and to output the execution screen on the second driving frequency region 160_1b when the driving frequency is 60 Hz. According to an embodiment, the processor 140 may control to output a second content screen set to drive at the second driving frequency (e.g., 60 Hz) on the second driving frequency region 160_1b at the same time, while outputting a first content screen set to drive at the first driving frequency (e.g., 120 Hz) on the first driving frequency region 160_1a. In this process, the DDI 200 may control the first gate driver 160_12a and the second gate driver 160_12b such that the first driving frequency region 160_1a drives at 120 Hz and such that the second driving frequency region 160_1b drives at 60 Hz. The first gate driver 160_12a may charge only gate lines arranged in the first driving frequency region 160_1a with a voltage at a timing of 120 Hz and may charge only gate lines arranged in the second driving frequency region 160_1b with a voltage at a timing of 60 Hz, thus assisting in operating a multi-driving frequency in the one display panel 160_11. The source driver 160_13 may output display data to source lines depending to settings. According to various embodiments, settings of driving frequencies of the first driving frequency region 160_1a and the second driving frequency region 160_1b may be changed according to a configuration of the display. For example, driving frequency values of the first driving frequency region 160_1a and the second driving frequency region 160_1b may be set identical to each other or different from each other, according to a user input or an application setting, when the electronic device is booted.

As in 303, a second type display 160_2 according to an embodiment may include a display panel 160_21 which operates in a first driving frequency region 160_2a, a second driving frequency region 160_2b, and a third driving frequency region 160_2c, a gate driver 160_22 which supplies a gate signal to the display panel 160_21, and a source driver 160_23. The first driving frequency region 160_2a may be, for example, a region set to drive at 120 Hz or may include a region which outputs an execution screen of an application which drives at a driving frequency of 120 Hz. The second driving frequency region 160_2b may be, for example, a region set to drive at 60 Hz or may include a region which outputs an execution screen of an application which drives at a driving frequency of 60 Hz. The third driving frequency region 160_2c may be, for example, a region set to drive at 30 Hz or may include a region which outputs an execution screen of an application which drives at a driving frequency of 30 Hz. According to an embodiment, when the running of an application is requested, the processor 140 may identify setting information of the application to identify a driving frequency and may control to output an execution screen on the first driving frequency region 160_2a when the driving frequency is 120 Hz, output the execution screen on the second driving frequency region 160_2b when the driving frequency is 60 Hz, and output the execution screen on the third driving frequency region 160_2c when the driving frequency is 30 Hz. According to an embodiment, the processor 140 may control to output a third content screen set to drive at the third driving frequency (e.g., 30 Hz) on the third driving frequency region 160_2c together with outputting a second content screen set to drive at the second driving frequency (e.g., 60 Hz) on the second driving frequency region 160_2b, while outputting a first content screen set to drive at the first driving frequency (e.g., 120 Hz) on the first driving frequency region 160_2a. In conjunction with the above-mentioned operation, the gate driver 160_22 may operate to charge a voltage of the respective gate lines of the display panel 160_21 at a timing, which may skip charging of specific gate lines depending on settings. For example, the gate driver 160_22 may charge gate lines of the first driving frequency region 160_2a with a voltage at 120 Hz in response to the control of the DDI 200 (or the processor 140), may perform a skip of charging of gate lines of the second driving frequency region 160_2b at 120 Hz as a default at ½ frequency such that the second driving frequency region 160_2b operates at 60 Hz, and may perform a skip of charging of gate lines of the third driving frequency region 160_2c at 120 Hz as a default at ¾ frequency (or charge the shift register gate with a voltage at ¼ frequency) such that the third driving frequency region 160_2c operates at 30 Hz. According to various embodiments, settings of driving frequencies of the first driving frequency region 160_2a, the second driving frequency region 160_2b, and the third driving frequency region 160_2c may be changed according to a configuration of the display. For example, driving frequency values of at least some of the first driving frequency region 160_2a, the second driving frequency region 160_2b, and the third driving frequency region 160_2c may be set identical to each other or different from each other, according to a user input or an application setting, when the electronic device is booted. According to various embodiments, driving frequency values of the first driving frequency region 160_2a and the second driving frequency region 160_2b may be set identical to each other, and a driving frequency value of the third driving frequency region 160_2c may be set different from those of the other regions.

As in 305, a third type display 160_3 according to an embodiment may include a display panel 160_31 which operates in first to sixth driving frequency regions 160_3a, 160_3b, 160_3c, 160_3d, 160_3e, and 160_3f, a gate driver 160_32 (or a gate shift register) which supplies a gate signal to the display panel 160_31, a first source driver 160_33a, and a second source driver 160_33b. The first driving frequency region 160_3a may be a region set to drive at 120 Hz according to the signal supply of the gate driver 160_32 and the first source driver 160_33a or may include a region which outputs an execution screen of an application which drives at a driving frequency of 120 Hz. The second driving frequency region 160_3b may be a region set to drive at 60 Hz according to the signal supply of the gate driver 160_32 and the first source driver 160_33a or may include a region which outputs an execution screen of an application which drives at a driving frequency of 60 Hz. In this regard, the gate driver 160_32 may control to skip charging of a shift register for gate lines at ½ frequency with respect to a default signal at 120 Hz, when the second driving frequency region 160_3b is driven, such that the second driving frequency region 160_3b drives at 60 Hz. The third driving frequency region 160_3c may be a region set to drive at 30 Hz according to the signal supply of the gate driver 160_32 and the first source driver 160_33a or may include a region which outputs an execution screen of an application which drives at a driving frequency of 30 Hz. In this regard, the gate driver 160_32 may control to skip charging of the shift register for the gate lines at ¾ frequency with respect to the default signal at 120 Hz, when the third driving frequency region 160_3c is driven, such that the third driving frequency region 160_3c drives at 30 Hz. The fourth driving frequency region 160_3d may be a region set to drive at 120 Hz according to the signal supply of the gate driver 160_32 and the second source driver 160_33b or may include a region which outputs an execution screen of an application which drives at a driving frequency of 120 Hz. The fifth driving frequency region 160_3e may be a region set to drive at 40 Hz according to the signal supply of the gate driver 160_32 and the second source driver 160_33b or may include a region which outputs an execution screen of an application which drives at a driving frequency of 40 Hz. In this regard, the gate driver 160_32 may control to skip charging of the shift register for the gate lines at ⅔ frequency with respect to the default signal at 120 Hz (or perform charging of the shift register corresponding to gate lines at ⅓ frequency), when the fifth driving frequency region 160_3e is driven, such that the fifth driving frequency region 160_3e drives. When content screens are respectively output on the second driving frequency region 160_3b and the fifth driving frequency region 160_3e, the DDI 200 may control to adjust each of data signal output timings of the first source driver 160_33a and the second source driver 160_33b to drive at different driving frequencies. The sixth driving frequency region 160_3f may be a region set to drive at 30 Hz according to the signal supply of the gate driver 160_32 and the second source driver 160_33b or may include a region which outputs an execution screen of an application which drives at a driving frequency of 30 Hz. The sixth driving frequency region 160_3f may be driven to be similar to the driving of the third driving frequency region 160_3c. As described above, the third type display 160_3 may divide a screen of the display panel 160_31 on a vertical axis and may assist in operating a multi-driving frequency. According to various embodiments, settings of driving frequencies of at least some of the first driving frequency region 160_3a, the second driving frequency region 160_3b, third driving frequency region 160_3c, the fourth driving frequency region 160_3d, the fifth driving frequency region 160_3e, and the sixth driving frequency region 160_3f may be changed according to a configuration of the display. For example, driving frequency values of at least some of the first to sixth driving frequency regions 160_3a, 160_3b, 160_3c, 160_3d, 160_3e, and 160_3f may be set identical to each other or different from each other, according to a user input or an application setting, when the electronic device is booted. According to an embodiment, driving frequency values of the first driving frequency region 160_3a and the second driving frequency region 160_3b may be identically set to a first value, driving frequency values of the third driving frequency region 160_3c and the fourth driving frequency region 160_3d may be identically set to a second value, and driving frequency values of the fifth driving frequency region 160_3e and the sixth driving frequency region 160_3f may be identically set to a third value. According to various embodiments, driving frequency settings of the first driving frequency region 160_3a, the second driving frequency region 160_3b, and third driving frequency region 160_3c may be identically set to the first value, and driving frequency values of the fourth driving frequency region 160_3d, the fifth driving frequency region 160_3e, and the sixth driving frequency region 160_3f may be identically set to the second value. According to an embodiment, driving frequency values of four or five regions may be set identical to one another, and driving frequency values of the remaining regions may be set different from the driving frequency values of the other regions.

As in 307, a fourth type display 160_4 according to an embodiment may include a display panel 160_41 which operates in first to sixth driving frequency regions 160_4a, 160_4b, 160_4c, 160_4d, 160_4e, and 160_4f, a gate driver 160_42 which supplies a gate signal to the display panel 160_41, and a source driver 160_43. For example, the first driving frequency region 160_4a and the fourth driving frequency region 160_4d may be regions which drive at 120 Hz or regions which output an execution screen of an application set to drive at 120 Hz, the second driving frequency region 160_4b may be a region which drives at 60 Hz or a region which outputs an execution screen of an application set to drive at 60 Hz, the third driving frequency region 160_4c and the sixth driving frequency region 160_4f may be regions which drive at 30 Hz or regions which outputs an execution screen of an application set to drive at 30 Hz, and the fifth driving frequency region 160_4e may be a region which drives at 40 Hz or a region which outputs an execution screen of an application set to drive at 40 Hz. The fourth type display 160_4 having the above-mentioned configuration may provide regions to which the multi-driving frequency is applied, which are divided into six, by adjusting a gate voltage charging timing of a shift register of the gate driver 160_42 which supplies a signal to the first to sixth driving frequency regions 160_4a, 160_4b, 160_4c, 160_4d, 160_4e, and 160_4f and adjusting a voltage charging timing corresponding to a data signal of a shift register of the source driver 160_43. Location settings and driving frequency values for the above-mentioned first to sixth driving frequency regions 160_4a, 160_4b, 160_4c, 160_4d, 160_4e, and 160_4f may be determined when the electronic device 100a or 100b is booted or may be changed in real time according to user settings. For example, driving frequency values of at least some of the first to sixth driving frequency regions 160_4a, 160_4b, 160_4c, 160_4d, 160_4e, and 160_4f illustrated in 307 may be set identical to one another.

Figure 4:
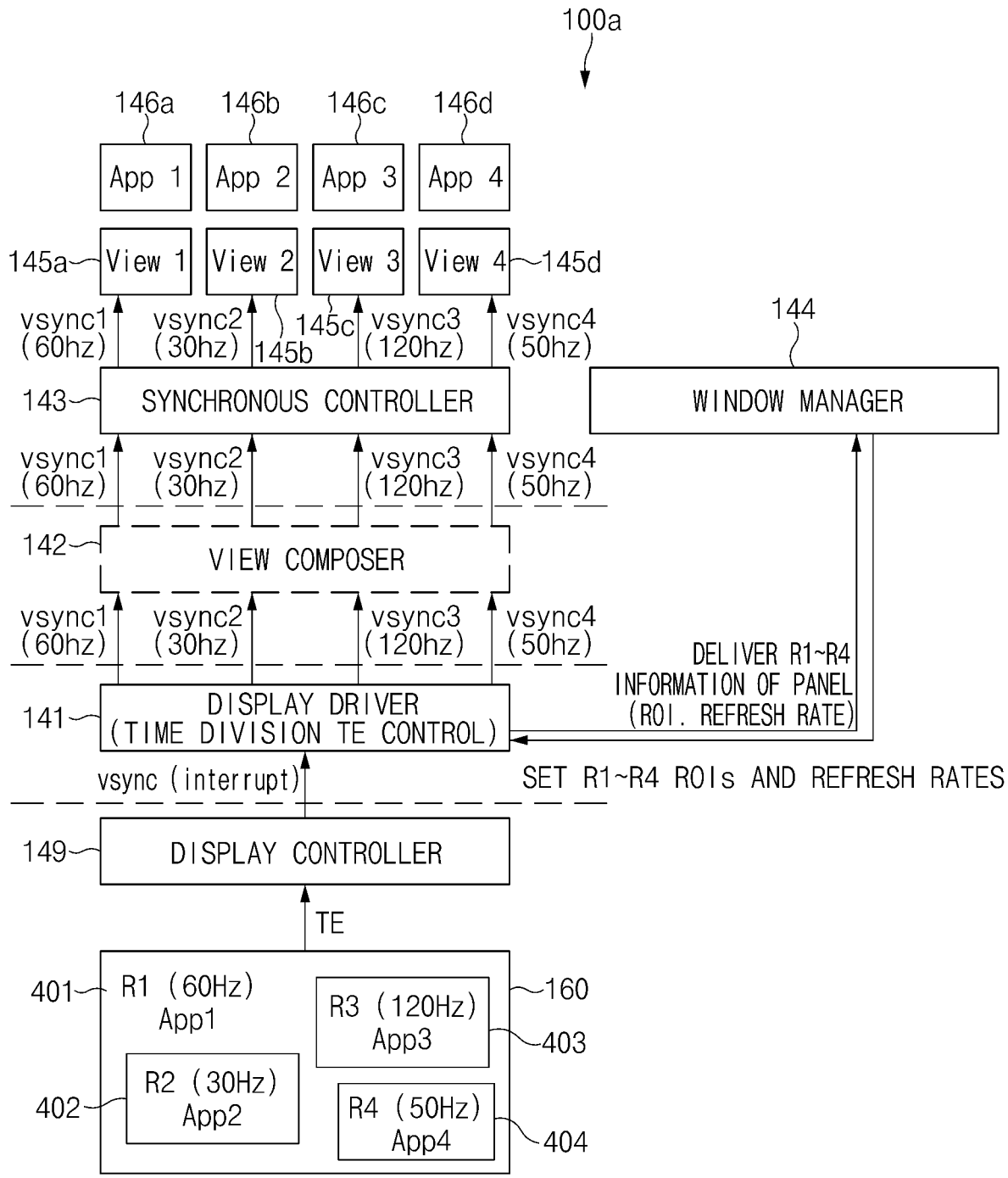
FIG. 4 is a diagram illustrating an example of function blocks of an electronic device associated with operation of a multi-driving frequency according to an embodiment.

FIG. 4 is a diagram illustrating an example of function blocks of an electronic device 100a associated with operation of a multi-driving frequency according to an embodiment. Applications App1, App2, App3, and App4 and execution screens View 1, View 2, View 3, and View 4, among components illustrated in FIG. 4, may correspond to data or a memory which stores data. The remaining components may include a component, at least a part of which is configured with hardware or is configured with software to be stored in a memory 130 to perform a specified function by an operation of the processor 140.

Referring to FIG. 4, at least a part of the electronic device 100a (or an electronic device 100b) associated with operation of a multi-driving frequency according to an embodiment may include a display 160, a display controller 149, a view composer 142, a synchronous controller 143, a window manager 144, a display driver 141, the execution screens View 1, View 2, View 3, and View 4, and the applications App1, App2, App3, and App4. According to various embodiments, the view composer 142 may be omitted or may be integrated into the synchronous controller 143, according to a type of an operating system. According to various embodiments, the display controller 149 may be included in a hardware configuration. According to various embodiments, the display driver 141 may be included in a kernel configuration. According to various embodiments, the view composer 142 may be included in a native library configuration. At least one of the synchronous controller 143 and the window manager 144 may be included a framework (e.g., Java framework) configuration.

The display 160 may be one of at least one display described in FIGS. 1 to 3. According to an embodiment, the display 160 may be configured as one panel, which may include a first region 401 where a first content screen is output based on a first driving frequency (e.g., 60 Hz), a second region 402 where a second content screen is output based on a second driving frequency (e.g., 30 Hz), a third region 403 where a third content screen is output based on a third driving frequency (e.g., 120 Hz), and a fourth region where a fourth content screen is output based on a fourth driving frequency (e.g., 50 Hz). The first content screen may include, for example, an execution screen corresponding to running of the first application App1, and the second content screen may include an execution screen corresponding to running of the second application App2. The third content screen may include, for example, an execution screen corresponding to running of the third application App3, and the fourth content screen may include an execution screen corresponding to running of the fourth application App4. The display 160 may deliver one TE signal to the display controller 149. The display controller 149 and the display 160 may communicate each other through a mobile Industry Processor Interface (MIPI).

The display controller 149 may include an HW block which is present in the processor 140 (e.g., an application processor (AP)). The display controller 149 may perform an image update of the display 160. To prevent a tearing effect which occurs by overwriting a new image before the image update of the display 160 is completed, when the display 160 transmits an update period and phase information as a TE signal, the display controller 149 may receive it and may deliver it to the display driver 141 by means of vsync interrupt. Furthermore, the display controller 149 may serve to transmit a command for controlling the display 160 through the display driver 141 and may receive and deliver information of the display 160 to the display driver 141.

The view composer 142 (e.g., SurfaceFlinger) may receive images rendered by the respective applications App1, App2, App3, and App4 and may compose the images into one image at a timing of vsync (vertical sync or a vertical synchronous signal) vsync1, vsync2, vsync3, or vsync4. For example, when receiving each rendered image from a status bar application, a launcher application, a navigation bar application, and a wallpaper application, the view composer 142 may compose the images into one image at a timing of vsync, and may deliver the one image to the display controller 149 to be displayed on the display 160.

The synchronous controller 143 (e.g., a choreographer) may be triggered to render a screen (e.g., view 1, view 2, view 3, or view 4) interworking with each application at vsync (vsync1, vsync2, vsync3, or vsync4).

The window manager 144 (e.g., window manager) may support windows of the respective applications App1, App2, App3, and App4. Furthermore, the window manager 144 may receive a request for a variable refresh rate (VRR) (a variable frequency) from the respective applications App1, App2, App3, and App4, may adjust at least a portion of a driving frequency (a refresh rate) value to be changed, when at least one of heating, current consumption, and illumination values meets a specified criterion, with regard to heating, current consumption, illumination, or the like of a current system, may finally determine a VRR value, and may request the display driver 141. According to various embodiments, when the condition of verifying a consideration (e.g., at least one of the heating, the current consumption, and the illumination value) of the system factor is released, a value adjusted according to the system factor may be excluded from the determination of the final VRR value.

The display driver 141 (e.g., the display driver) may control an HW block corresponding to the display controller 149. The display driver 141 may receive the Vsync interrupt and may deliver vsync period/phase information vsync1, vsync2, vsync3, and vsync4 to the view composer 142. The display driver 141 may control the display controller 149 to set an operation of the display 160 based on the image update of the display 160 and the VRR variable frequency.

The execution screens View 1, View 2, View 3, and View 4 may be a service provided from a framework (e.g., an Android OS framework) of a specific operating system, which may provide image frames used in the application as templates. After the rendering event is received, when it is triggered by vsync vsync1, vsync2, vsync3, and vsync4 from the synchronous controller 143, the rendered execution screens View 1, View 2, View 3, and View 4 may be provided.

In the above-mentioned electronic device in the specification, a signal line of one TE (or a number of TEs less than the first to fourth regions 401, 402, 403, and 404 as all expressible driving frequency (refresh rate) regions) may be formed as an HW point between the display 160 and the display controller 149. The above-mentioned electronic device 100a may dynamically change sizes of the respective first to fourth regions 401, 402, 403, and 404. For example, the display controller 149 may dynamically change sizes and driving frequencies (refresh rates) of the respective regions. The display controller 149 may select a specific region among the respective fourth regions 401, 402, 403, and 404 depending on a specified condition or in response to an input and may receive a TE signal synchronized with a driving frequency of the selected region.

The synchronous controller 143 may support multiple vsync events vsync1, vsync2, vsync3, and vsync4. For example, the synchronous controller 143 may receive vsync information corresponding to the execution screens View 1, View 2, View 3, and View 4 of the respective applications App1, App2, App3, and App4 from the window manager 144 and may link the execution screens View 1, View 2, View 3, and View 4 with a vsync event. For example, the synchronous controller 143 may trigger the first execution screen view1 at an event of vsync1 60 hz and may trigger the second execution screen view2 at vsync2 30 hz.

The window manager 144 may receive changeable minimum or maximum sizes and VRR information of the respective fourth regions 401, 402, 403, and 404 of the display 160 from the display driver 141. For example, the window manager 144 may change a region of interest (ROI) size from a minimum ¼ region at a left upper end to a maximum full screen in conjunction with the second region 402 and may receive physical support limit information of the display 160, including that it is possible to change the VRR of the second region 402 from minimum 10 Hz to 120 Hz from the display driver 141. When ROIs of the respective applications App1, App2, App3, and App4 are changed, the window manager 144 may link the corresponding first to fourth regions 401, 402, 403, and 404 with the synchronous controller 143 to be triggered at vsync vsync1, vsync2, vsync3, and vsync4. For example, as the third application App3 is run, when the ROI corresponds to the third region 403, the window manager 144 may link the synchronous controller 143 with the third execution screen view3 to be triggered at vsync3 (120 Hz).

Information stored in each of the applications App1, App2, App3, and App4 may include optimal driving frequency (refresh rate) request information, an ROI limit value of an available region of the display 160, and VRR information. The display driver 141 may determine optimal vsync of the respective applications App1, App2, App3, and App4 based on information of the above-mentioned applications App1, App2, App3, and App4 and may request the display controller 149 to set ROI sizes and driving frequencies (refresh rates) of the respective fourth regions 401, 402, 403, and 404 of the display 160.

Figure 5:
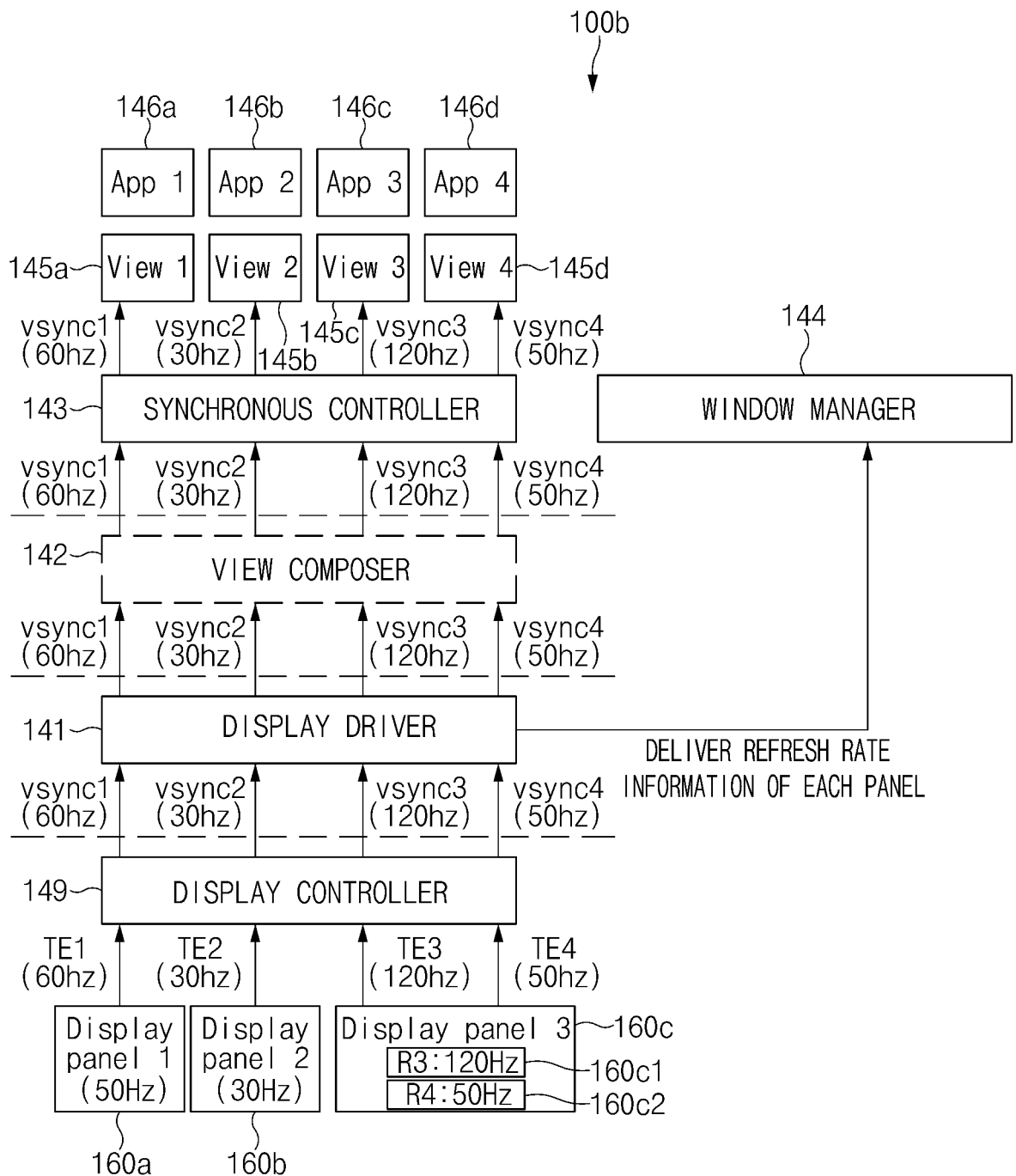
FIG. 5 is a diagram illustrating another example of function blocks of an electronic device associated with operation of a multi-driving frequency according to an embodiment.

FIG. 5 is a diagram illustrating another example of function blocks of an electronic device 100b associated with operation of a multi-driving frequency according to an embodiment. Applications App1, App2, App3, and App4 and execution screens View 1, View 2, View 3, and View 4, in components illustrated in FIG. 4, may correspond to data or a memory which stores data. The remaining components may include a component, at least a part of which is configured with hardware or is configured with software to be stored in a memory 130 to perform a specified function by an operation of the processor 140.

Referring to FIG. 5, at least a part of the electronic device 100b associated with operation of a multi-driving frequency according to an embodiment may include a plurality of displays 160a, 160b, and 160c (160c1 and 160c2), a display controller 149, a view composer 142, a synchronous controller 143, a window manager 144, a display driver 141, the execution screens View 1, View 2, View 3, and View 4, and the applications App1, App2, App3, and App4. According to various embodiments, the view composer 142 may be omitted or may be integrated into the synchronous controller 143, according to a type of an operating system or a type of an applied platform.

The plurality of displays 160a, 160b, and 160c may be displays which are physically divided. For example, the plurality of displays 160a, 160b, and 160c may include the displays described above in FIG. 2. The plurality of displays 160a, 160b, and 160c may be connected with the display controller 149 through TE HW pins TE1, TE2, TE3, and TE4 which are independent of each other. Thus, each of the displays 160a, 160b, and 160c may deliver its own TE information (e.g., a period and a phase) to the display controller 149. The display driver 141 may deliver driving frequency information of the respective displays 160a, 160b, and 160c to the view composer 142 in the form of a vsync timestamp. According to an embodiment, the display driver 141 may deliver panel IDs of the respective displays 160a, 160b, and 160c and ROI region information of the respective displays 160a, 160b, and 160c to the window manager 144. The window manager 144 may link the respective execution screens with the synchronous controller 143 to be triggered at vsync vsync 1, vsync 2, vsync 3, and vsync 4 matched with the ROI regions of the respective applications App1, App2, App3, and App4 and the displays 160a, 160b, and 160c (160c1 and 160c2). According to various embodiments, at least some of the plurality of displays 160a, 160b, and 160c described above in FIG. 5 may be divided and operated into the plurality of driving frequency regions described above in FIG. 4.

Figure 6:
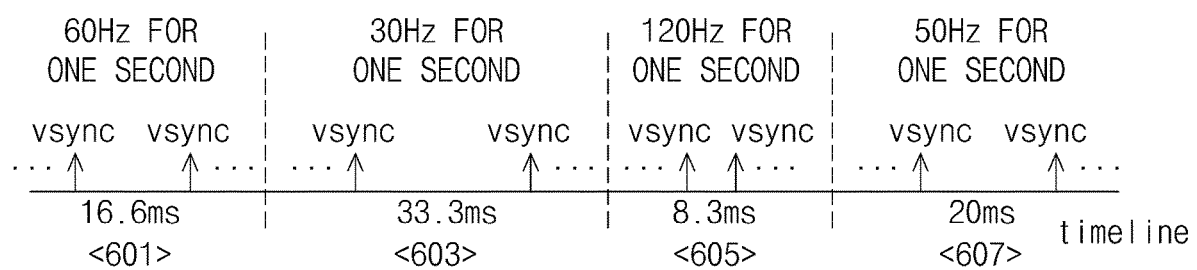
FIG. 6 is a diagram illustrating an example of time division driving associated with operation of a multi-driving frequency according to an embodiment.

FIG. 6 is a diagram illustrating an example of time division driving associated with operation of a multi-driving frequency according to an embodiment.

Referring to FIG. 6, a DDI 200 (or a processor 140) may perform time division driving as shown in steps 601 to 607 illustrated in conjunction with operation of driving frequencies of respective regions 401, 402, 403, and 404 of a display 160 of FIG. 4 or a plurality of displays 160a, 160b, and 160c of FIG. 5, which drive at different driving frequencies. In this process, the DDI 200 may control TE signals of the display 160 of FIG. 4 or the plurality of displays 160a, 160b, and 160c of FIG. 5 based on vsync timing information driven by a gate driver and a source driver. According to various embodiments, the DDI 200 may change a timing and period of a TE signal depending to a request to run an application, without reception of the TE signal.

According to an embodiment, the DDI 200 may control to drive a first region 401 of FIG. 4 (or the first display 160a of FIG. 5) at a first driving frequency (e.g., 60 Hz) for one second, drive a second region 402 of FIG. 4 (or the second display 160b of FIG. 5) at a second driving frequency (e.g., 30 Hz) for the next one second, drive a third region 403 of FIG. 4 (or one region 160c1 of the third display 160c of FIG. 5) at a third driving frequency (e.g., 120 Hz) for the next one second, and drive a fourth region 404 of FIG. 4 (or the other region 160c2 of the third display 160c of FIG. 5) at a fourth driving frequency (e.g., 50 Hz) for the next one second.

In conjunction with time division driving, the processor 140 (or a display driver 141) may select a region where an image update occurs by time division and may receive vsync by means of the TE signal. Herein, when the image update of only a specific region is being performed, the processor 140 may perform time division of only the corresponding region and may receive vsync by means of the TE signal. In this case, the display driver 141 may deliver multiple vsync timestamp information of vsync1~vsync4 to a view composer 142. The display driver 141 may obtain and deliver arrangement locations of the first to fourth regions 401, 402, 403, and 404, time division orders of the regions 401, 402, 403, and 404, changeable region of interest (ROI) size limit value information of the regions 401, 402, 403, and 404, and available refresh rate information of the respective regions 401, 402, 403, and 404 from a display (e.g., the display 160 of FIG. 4 or the plurality of displays 160a, 160b, and 160c of FIG. 5) to a window manager 144, thus performing time division driving for the respective regions and an image update for each region according to it.

Figure 7:
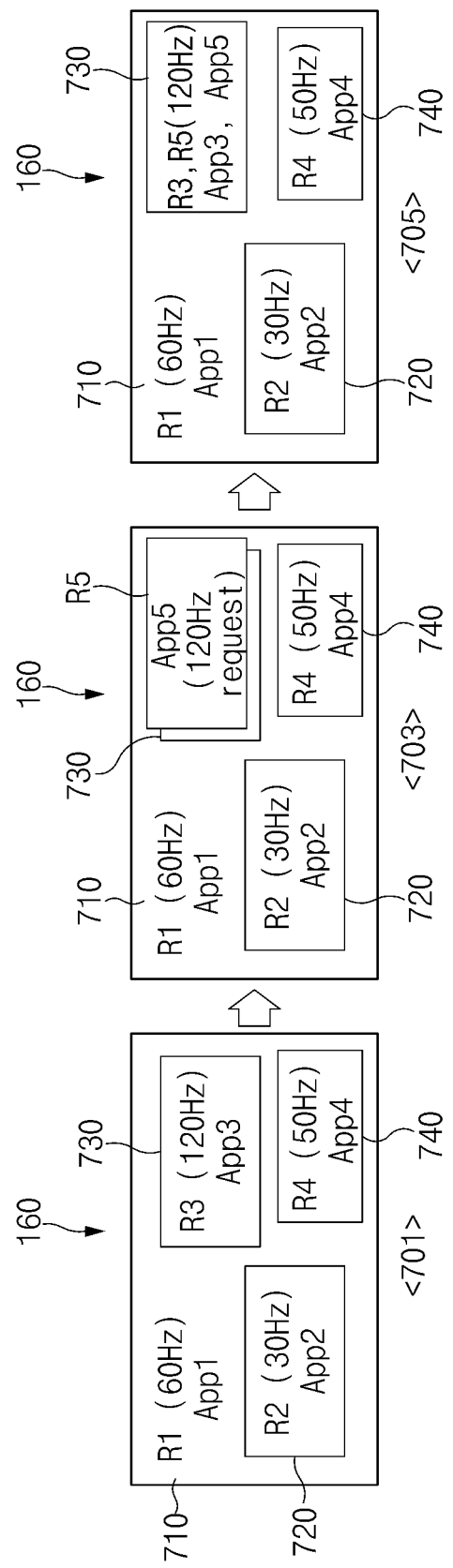
FIG. 7 is a diagram for describing operation of a multi-driving frequency according to running of an additional application according to an embodiment.

FIG. 7 is a diagram for describing operation of a multi-driving frequency according to running of an additional application according to an embodiment.

Referring to FIG. 7, as in 701, a display 160 may run four applications or may output four content screens on four regions 710, 720, 730, and 740 as shown. A first execution screen R1 according to running of a first application App1 may be output on the first region 710 among the four regions 710, 720, 730, and 740. A second execution screen R2 according to running of a second application App2 may be output on the second region 720. A third execution screen R3 according to running of a third application App3 may be output on the third region 730. A fourth execution screen R4 according to running of a fourth application App4 may be output on the fourth region 740. Herein, the first region 710 may be a region driven at a first driving frequency (e.g., 60

Hz), the second region 720 may be a region driven at a second driving frequency (e.g., 30 Hz), the third region 730 may be a region driven at a third driving frequency (e.g., 120 Hz), and the fourth region 740 may be a region driven at a fourth driving frequency (e.g., 50 Hz).

In addition, when a fifth application App5 is run or when the output of a fifth execution screen R5 is requested in response to the running of the fifth application App5, as in 703 and 705, the fifth execution screen R5 may be overlapped and disposed on the third region 730. In this regard, when it is requested to run the fifth application App5, the processor 140 may identify information recorded in the fifth application App5 and may identify an optimal driving frequency of the fifth application App5. When identifying the optimal driving frequency of the fifth application App5, the processor 140 may determine a driving frequency to drive the fifth execution screen R5, while configuring an execution screen according to the running of the fifth application App5. In this process, the processor 140 may control to select the same region (e.g., the third region 730) as a driving frequency to output the fifth execution screen R5 and output the fifth execution screen R5 on the third region 730. For example, when it is requested to run the fifth application App5 and when it is identified that the driving frequency is 120 Hz, a window manager 144 may request a display controller 149 to include at least a portion of the third region 730 in an ROI of the fifth application App5.

According to various embodiments, the processor 140 may identify the third region 730 driven at the same driving frequency as the fifth execution screen R5 and may adjust a size of the fifth execution screen R5 depending on a size of the third region 730. According to various embodiments, the processor 140 may output the fifth execution screen R5 on the third region 730, which may output it together with the third execution screen R3 of the previously output third application App3 as one screen. For example, the processor 140 may divide the third region 730 into two regions and may separately output the third execution screen R3 and the fifth execution screen R5 on the divided regions. Alternatively, the processor 140 may display the third execution screen R3 as a background on the third region 730 and may configure the fifth execution screen R5 at a size smaller than the third execution screen R3 to output the fifth execution screen R5 on the third execution screen R3.

According to various embodiments, when the fifth execution screen R5 is set to overlap a plurality of regions among the first to fourth regions 710, 720, 730, and 740 (e.g., when it is identified by means of contents previously recorded in execution information of the fifth application App5), the processor 140 may set the corresponding execution screen to be triggered by vsync of the highest driving frequency among the overlapped regions. For example, when the sixth application is set to include and display all the first region 710, the third region 730, and the fourth region 740, the processor 140 may interwork with a synchronous controller 143 such that the execution screen is triggered at the highest 120 Hz vsync3 among the three regions.

Figure 8:
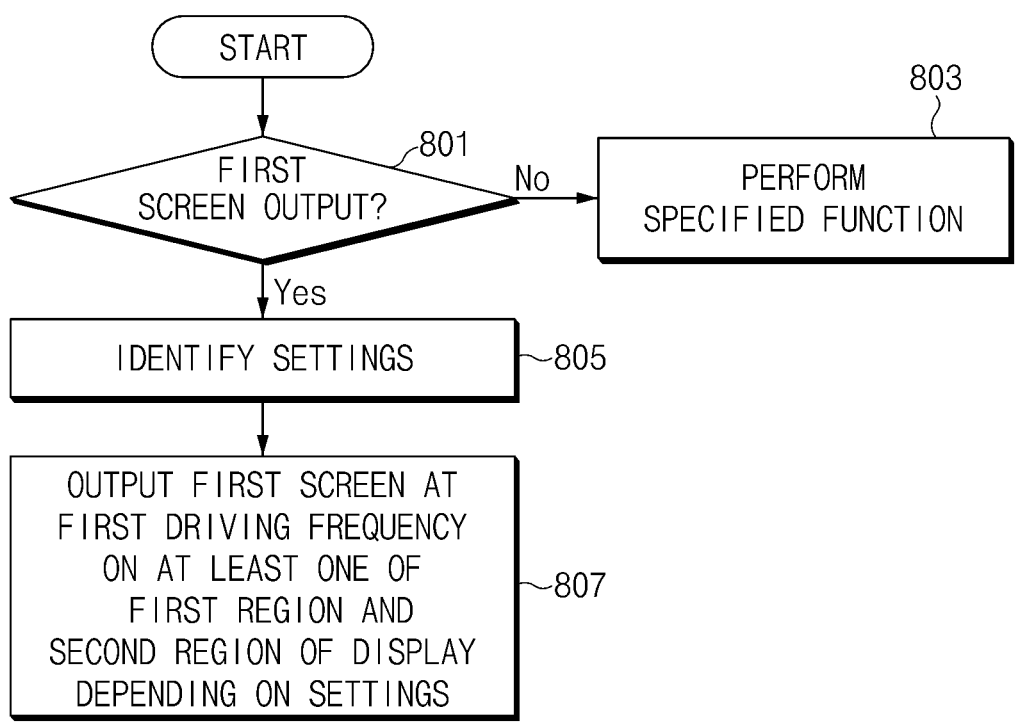
FIG. 8 is a flow diagram illustrating an example of a multi-driving method of a display according to an embodiment.

FIG. 8 is a flow diagram illustrating an example of a multi-driving method of a display according to an embodiment.

Referring to FIG. 8, in conjunction with the multi-driving method of the display according to an embodiment, in operation 801, a processor 140 of an electronic device may identify whether a first screen output is requested. According to various embodiments, the requesting of the first screen output may include an operation of receiving a first input. The first input may include, for example, a turn-on input of the electronic device or an input associated with turning on a display 160, for example, reception of a phone call connection request or reception of a message. According to an embodiment, the operation of identifying the first screen output request may include an operation of identifying whether it is requested to execute a specified function (e.g., a waiting screen providing function) after power is supplied to the display 160 in response to the turn-on input of the electronic device. According to an embodiment, the operation of identifying the first screen output request may include an operation of identifying whether a specified event (e.g., reception of a call connection request) occurs when the electronic device is in a sleep state (e.g., in a state where the display is turned off, but the processor 140 operates). According to an embodiment, the identifying of the first screen output request may include an operation of, after a specified menu or icon is output under control of the processor 140, identifying whether a user input associated with selecting the corresponding menu item or icon occurs.

When the first screen output is not requested, in operation 803, the processor 140 may process to perform a specified function. For example, the processor 140 may perform a function (e.g., a music playback function) of having a communication waiting function or outputting an audio signal by means of background processing, while maintaining a turn-off state of the display 160. Alternatively, the processor 140 may perform collection of health information (e.g., sensor information using a sensor unit), while maintaining the turn-off state of the display 160.

When the first screen output is requested, in operation 805, the processor 140 may identify settings. In this regard, the processor 140 may identify setting information of an application associated with the requested first screen output. The setting information of the application may be information recorded in data making up the application (e.g., application data stored in a memory), which may include at least one of identification information of the application, version information of the application, optimal driving frequency information of a screen according to running of the application, or optimal rate or size information of the screen according to the running of the application. The processor 140 may at least identify optimal driving frequency information of the application in the operation of identifying the settings.

In operation 807, the processor 140 may output the first screen on at least one of a first region and a second region of the display 160 at a first driving frequency depending on the settings or other configuration. Driving frequencies of the first region and the second region may be determined identical to each other or different from each other, when the electronic device is booted or according to user settings. The settings of the driving frequencies of the first region and the second region may be previously stored in a memory 130 or may be updated or may be changed according to a user change request. Alternatively, optimal driving frequencies (or available driving frequencies) of the first region and the second region may be determined, when the electronic device is manufacture, according to a hardware characteristic or a physical characteristic of the display 160 (e.g., arrangement of a gate driver, a source driver, gate lines, and source lines and a range of a support function).

According to various embodiments, the processor 140 may output the first screen on a region matched with the optimal driving frequency information of the first screen obtained according to identifying the settings. Alternatively, the processor 140 may output the first screen on a region which most closely matches the optimal driving frequency information of the first screen (e.g., the first region, when the optimal driving frequency information of the first screen is 110 Hz and when the first region assists in operation of the driving frequency of 120 Hz and the second region assists in operation of the driving frequency of 60 Hz).

According to various embodiments, when the size of the first screen is higher than the optimal driving frequency in an output priority of the first screen (where the output priority may be determined when an application is manufactured or may be changed according to user settings), the processor 140 may determine a region to be output in preference to the size of the first screen (or a display to be output when there are a plurality of displays). For example, the processor 140 may compare a size of the first region or a size of the second region with an output setting size of the first screen and may output the first screen on a region with a small size difference. When the size of the first region and the size of the second region are identical to each other, the processor 140 may identify another output condition (e.g., an optimal driving frequency) and may output the first screen. According to various embodiments, the processor 140 may output the first screen on a region matched with both the size of the first screen and the optimal driving frequency. For example, the processor 140 may select a region with a small size error between the first screen and the regions and a small error value between the optimal driving frequency of the first screen and driving frequencies set in the regions and may output the first screen. When a first screen output condition and a setting condition of the regions are the same as or similar to each other within a certain within, the processor 140 may output the first screen on both the first region and the second region.

Figure 9:
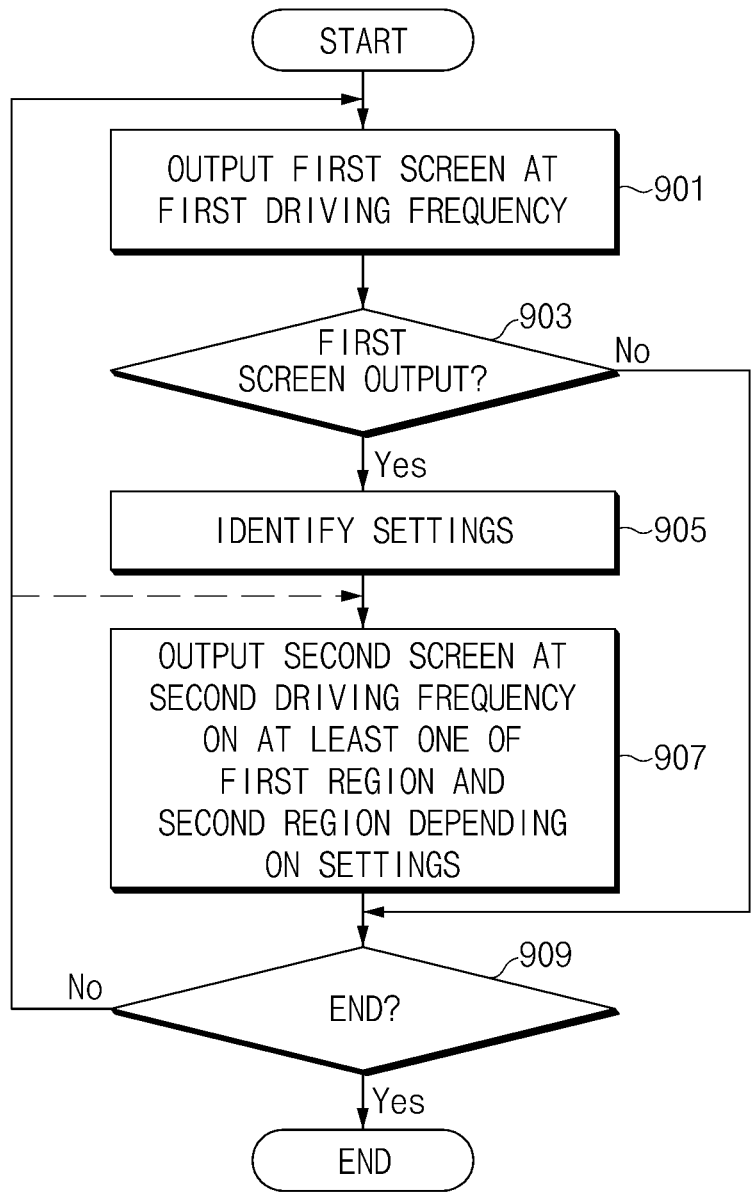
FIG. 9 is a flow diagram illustrating another example of a multi-driving method of a display according to an embodiment.

FIG. 9 is a flow diagram illustrating another example of a multi-driving method of a display according to an embodiment.

Referring to FIG. 9, in conjunction with the multi-driving method of the display according to an embodiment, in operation 901, a processor 140 of an electronic device may output a first screen at a first driving frequency. In this operation, the processor 140 may output the first screen on any one of a first region or a second region of a display 160 or over both the first region and the second region. The first screen may include, for example, a first execution screen according to a request to run a first application, which is thereby based on the execution of the first application.

In operation 903, the processor 140 may identify whether a second screen output is requested. The request to output the second screen may occur in various conditions. For example, the operation of requesting to output the second screen may include an operation of requesting to run a second application depending on the selection of at least one menu or icon output on the first screen. Alternatively, the operation of requesting to output the second screen may include an operation, for example, reception of a phone call connection request or message in the state where the first screen is output or arrival of a time point where the scheduled function is executed.

When the second screen output is requested, in operation 905, the processor 140 may identify settings. The operation of verifying the settings may include an operation of identifying setting information of the second application associated with the second screen (e.g., identifying information previously stored in a memory 130).

In operation 907, the processor 140 may output the second screen on at least one of the first region and the second region of the display 160 at a second driving frequency depending on the settings and configuration of the second application. In this regard, the processor 140 may identify an optimal frequency for operation of the second application (e.g., the second driving frequency) by identifying the setting information of the second application, and may select a region (e.g., the second region) set to operate at the corresponding driving frequency to output the second screen. When the second screen is not requested, the processor 140 may skip operation 905 and operation 907.

In operation 909, the processor 140 may identify whether an event associated with ending the display 160 occurs. When the event associated with ending the display 160 does not occur, the processor 140 may branch before operation 901 or may branch before operation 907, depending to a previous operation.

As described above, the multi-driving method of the display and the electronic device supporting the same according to an embodiment of the specification may separately drive a driving frequency suitable for each execution screen for each region to reduce the waste of an unnecessary resource (a CPU, a GPU, or a memory bandwidth), thus preventing an increase in current consumption, a high heating problem, and deterioration in the entire system performance. In addition, embodiments of the specification may suppress the occurrence of a frame judder due to the omission of frame transmission at intervals of a certain time or synchronization mismatch, which occurs by driving screens of different optimal driving frequencies at a specific driving frequency.

According to one of various electronic devices described above, an electronic device may include a display, a display driver integrated circuit that drives a first region of the display at a first driving frequency and drives a second region of the display at a second driving frequency, depending on settings, and a processor that provides display data to the display driver integrated circuit. The processor may identify a driving frequency of a first screen to be output on the display, in response to reception of a first input, and may control to output at least a portion of the first screen on a region driven at a driving frequency corresponding to the driving frequency of the first screen between the first region and the second region of the display.

According to various embodiments, the processor may be configured to identify an application (or a type of the application) requested to run in response to the first input and output the first screen according to running of the application on the first region, when the application (or the type of the application) is set to run at the first driving frequency.

According to various embodiments, the processor may be configured to identify an application requested to run in response to the first input (or a type of the application) and output the first screen according to running of the application on the second region, when the application (or the type of the application) is set to run at the second driving frequency.

According to various embodiments, the process may identify a size of the first screen to be output on the display and may select a region corresponding to the size of the first screen between the first region and the second region, when a size of the region driven at the driving frequency corresponding to the driving frequency of the first screen is different from the size of the first screen (e.g., when it is smaller than the size of the first screen), and may change a driving frequency of the selected region to suit the driving frequency of the first screen.

According to various embodiments, the processor may be configured to identify a size of the output first screen and output the first screen over the first region and the second region, when the size of the first screen is a size over the first region and the second region, and output the first screen at a relatively higher driving frequency between driving frequencies of the first region and the second region.

According to various embodiments, the processor may identify a size of the output first screen and may output the first screen over the first region and the second region, when the size of the first screen is a size over the first region and the second region, and may change driving frequencies of the first region and the second region over which the first screen is provided in response to the driving frequency of the first screen.

According to various embodiments, the processor may be configured to run a first application in response to the first input and output the first screen according to the running of the first application on the first region and run a second application in response to a second input, when the second input is received, and drive the second region at the second driving frequency while outputting a second screen according to the running of the second application on the second region.

According to various embodiments, the processor may be configured to run a first application in response to the first input and output the first screen according to the running of the first application on the first region and run a second application in response to a second input, when the second input is received, and drive the first region at the first driving frequency while overlaying and outputting a second screen according to the running of the second application on the first screen.

According to various embodiments, the processor may be configured to run a first application in response to the first input and output the first screen according to the running of the first application over the first region and the second region.

According to various embodiments, the processor may receive a second input, may run a second application in response to the second input and may drive the first region at the first driving frequency, while overlaying and outputting a second screen according to the running of the second application on a portion of the first screen of the first region, and may change a driving frequency of the second region to the first driving frequency, while adjusting a size of the first screen and outputting the first screen on the second region.

According to various embodiments, the processor may be configured to run a first application in response to the first input and output the first screen according to the running of the first application over the first region and the second region and run a second application in response to reception of a second input, when the second input is received, and drive the second region at the second driving frequency while overlaying and outputting a second screen according to the running of the second application on a portion of the first screen of the second region.

According to various embodiments, the processor may be configured to drive the first region at the first driving frequency, while adjusting a size of the first screen and outputting the first screen on the first region.

According to various embodiments, the electronic device may further include a first housing in which a part of the display is received and a second housing in which the rest of the display is received and a hinge structure connecting the first housing with the second housing. The first region of the display may correspond to the at least a part of the display, which is received in the first housing, and the second region of the display may correspond to the at least a part of the display, which is received in the second housing.

According to various embodiments, the electronic device may further include a sliding structure associated with extension of the display. The first region may include at least a portion of a region observed from the outside before a sliding operation of the sliding structure and the second region may include at least a portion of a region to which the display extends depending to the sliding operation of the sliding structure.

According to various embodiments, the electronic device may further include a rollable structure associated with extension of the display. The first region may include at least a portion of a region observed from the outside before a display rolling operation of the rollable structure and the second region may include at least a portion of a region extending after the display rolling operation of the rollable structure.

An electronic device according to one of the above-mentioned embodiments may include a plurality of displays, a plurality of display driver integrated circuits that drive the plurality of displays, and at least one processor that provides display data to the plurality of display driver integrated circuits. The processor may control to drive a first display and a second display among the plurality of displays at different driving frequencies, in response to a first input.

According to various embodiments, the processor may be configured to identify an application (or a type of the application) requested to run in response to the first input and output a first screen according to running of the application on the first display, when the application (or the type of the application) is set to run at a first driving frequency, or output the first screen according to running of the application on the second display, when the application (or the type of the application) is set to run at a second driving frequency.

According to various embodiments, the processor may identify a size of a first screen output according to the first input, may select a display corresponding to the size of the first screen between the first display and the second display, and may change a driving frequency of the selected display to suit a driving frequency of the first screen.

According to various embodiments, the processor may be configured to run a first application in response to the first input, output a first screen according to the running of the first application on the first display, run a second application in response to a second input, when the second input is received, and drive the second display at a second driving frequency while outputting a second screen according to the running of the second application on the second display.

A multi-driving method of a display according to one of various electronic devices described above may include receiving a first input, in operating the display including a first region driven at a first driving frequency and a second region driven at a second driving frequency different from the first driving frequency, depending on settings, running a first application in response to the reception of the first input, identifying a driving frequency of an execution screen to be output according to the running of the first application, and outputting the execution screen on a region corresponding to a driving frequency of the execution screen between the first region and the second region.

According to various embodiments, an electronic device according to an embodiment of the disclosure may include a display, a display driver integrated circuit that drives a first region of the display at a first driving frequency and drives a second region of the display at a second driving frequency, depending on settings, and a processor that provides display data to the display driver integrated circuit. The processor may identify a size of a first screen to be output on the display in response to reception of a first input, may select a region corresponding to the size of the first screen between the first region and the second region, and may change a driving frequency of the selected region to suit a driving frequency of the first screen.

According to various embodiments, an electronic device according to an embodiment of the disclosure may include a display, a display driver integrated circuit that drives a first region of the display at a first driving frequency and drives a second region of the display at a second driving frequency, depending on settings, and a processor that provides display data to the display driver integrated circuit. The processor may identify a size of a first screen to be output on the display in response to reception of a first input, may output the first screen over the first region and the second region, when the size of the first screen is a size over the first region and the second region, and may output the first screen at a relatively higher driving frequency between driving frequencies of the first region and the second region (e.g., drive both the first region and the second region at a relatively higher driving frequency and output the first screen) or may change driving frequencies of regions on which the first screen is output (e.g., only a region on which the first screen is output between the first region and the second region) to a driving frequency of the first screen.

Figure 10:
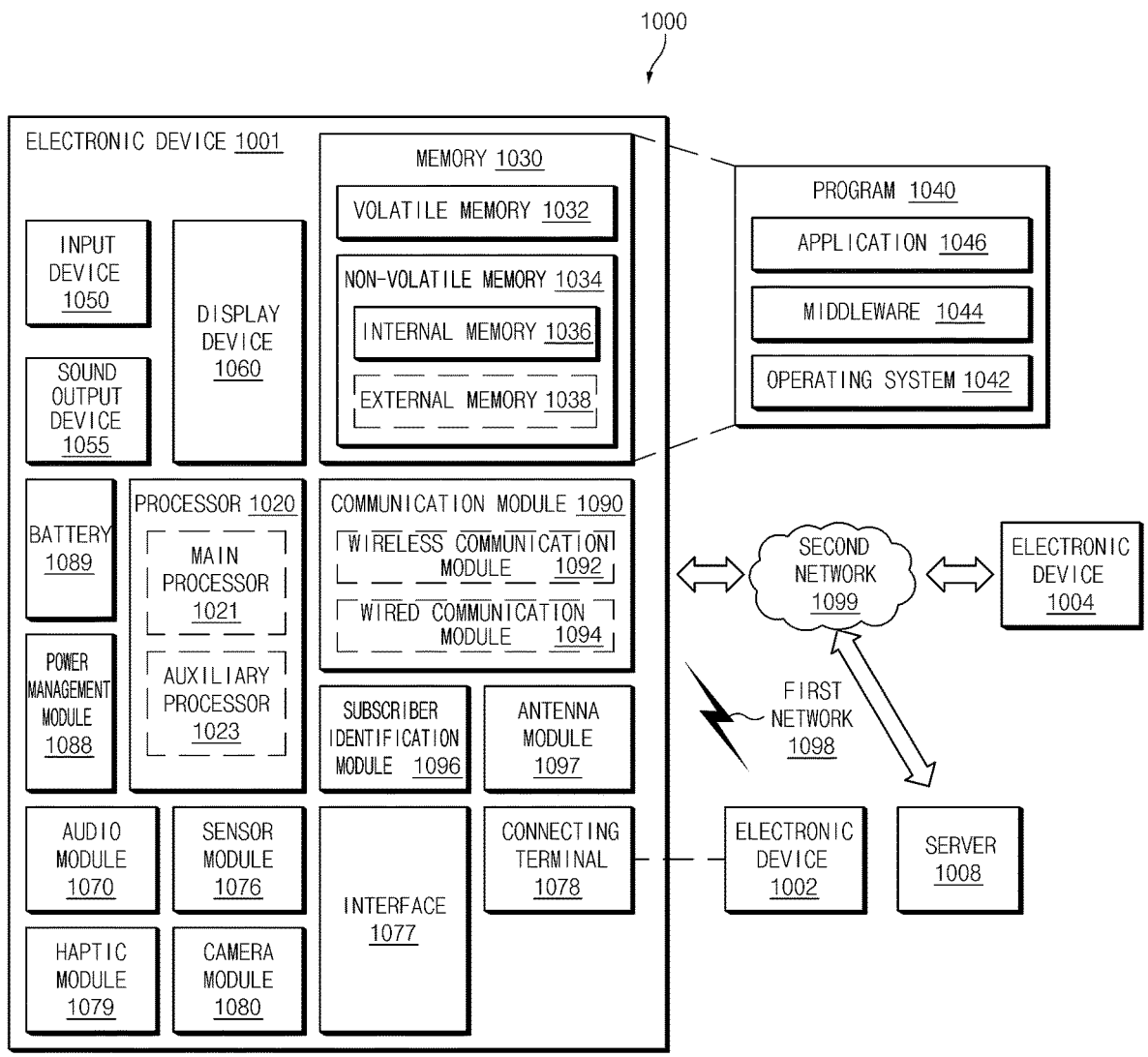
FIG. 10 is a block diagram illustrating an electronic device in a network environment according to various embodiments.

FIG. 10 is a block diagram illustrating an electronic device 1001 in a network environment 1000 according to various embodiments. Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module or device 1050, a sound output module or device 1055, a display module or device 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 1064 dB or less) for implementing mMTC, or U-plane latency (e.g., 0.5 ms or less for each of downlink (DL) and uplink (UL), or a round trip of 10 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   a display comprising a plurality of regions;
   a display driver integrated circuit configured to drive a first region of the plurality of regions at a first driving frequency and drive a second region of the plurality of regions at a second driving frequency according to a configuration of the display; and
   a processor configured to provide display data to the display driver integrated circuit,
   wherein the processor is configured to:
      identify a driving frequency of a first screen to be output on the display in response to reception of a first input,
      control the display to output at least one portion of the first screen on the first region driven at a driving frequency corresponding to the driving frequency of the first screen, and
      drive the second region at a driving frequency corresponding to a second screen, while overlaying and outputting the second screen over at least another portion of the first screen on the second region, in response to reception of a second input.

2. The electronic device of claim 1, wherein the processor is further configured to:
   identify an application to be executed in response to the first input, and
   output the first screen on the first region based on execution of the application when the application is configured to operate at the first driving frequency.

3. The electronic device of claim 1, wherein the processor is further configured to:
   identify an application to be executed in response to the first input, and
   output the at least other portion of the first screen on the second region based on execution of the application when the application is configured to operate at the second driving frequency.

4. The electronic device of claim 1, wherein the processor is further configured to:
   identify a size of the first screen to be output on the display,
   select a region of the plurality of regions corresponding to the size of the first screen, when a size of the region driven at the driving frequency corresponding to the driving frequency of the first screen is different from the size of the first screen, and
   change a driving frequency of the selected region based on the driving frequency of the first screen.

5. The electronic device of claim 1, wherein the processor is further configured to:
   identify a size of the first screen to be output on the display, and
   output the first screen over the first region and the second region, when the size of the first screen is greater than a size of each of the first region and the second region, and output the first screen at a driving frequency greater than the driving frequency of each of the first region and the second region.

6. The electronic device of claim 1, wherein the processor is further configured to:
   identify a size of the first screen to be output on the display,
   output the first screen over the first region and the second region, when the size of the first screen is greater than a size of each of the first region and the second region, and
   change driving frequencies of the first region and the second region over which the first screen is output, based on the driving frequency of the first screen.

7. The electronic device of claim 1, wherein the processor is further configured to:
   execute a first application in response to the first input,
   output the first screen on the first region based on the execution of the first application,
   execute a second application in response to the second input, when the second input is received, and
   drive the second region at the second driving frequency while outputting at least a portion of the second screen on the second region, based on the execution of the second application.

8. The electronic device of claim 1, wherein the processor is further configured to:
   execute a first application in response to the first input,
   output the first screen over the first region and the second region based on the execution of the first application,
   execute a second application in response to the second input, when the second input is received, and
   drive the second region at the second driving frequency, while overlaying and outputting the second screen over the at least other portion of the first screen on the second region, based on the execution of the second application.

9. The electronic device of claim 8, wherein the processor is further configured to:
drive the first region at the first driving frequency, while adjusting a size of the first screen and outputting the first screen on the first region.

10. The electronic device of claim 1, further comprising:
a first housing in which a first part of the display is located;
a second housing in which a second part of the display is located; and
a hinge structure connecting the first housing with the second housing,
wherein the first region of the display corresponds to at least the first part of the display, and
wherein the second region of the display corresponds to at least the second part of the display.

11. An electronic device, comprising:
a display comprising a plurality of regions;
a display driver integrated circuit configured to drive a first region of the plurality of regions at a first driving frequency and drive a second region of the plurality of regions at a second driving frequency according to a configuration of the display; and
a processor configured to provide display data to the display driver integrated circuit,
wherein the processor is configured to:
identify a driving frequency of a first screen to be output on the display in response to reception of a first input,
control the display to output at least one portion of the first screen on the first region driven at a driving frequency corresponding to the driving frequency of the first screen, and
drive the first region at the first driving frequency, while overlaying and outputting the second screen over at least another portion of the first screen on the first region, in response to reception of a second input.

12. The electronic device of claim 11, wherein the processor is further configured to:
execute a first application in response to the first input,
output the first screen on the first region based on the execution of the first application,
execute a second application in response to the second input, when the second input is received, and
drive the first region at the first driving frequency, while overlaying and outputting the second screen over the at least other portion of the first screen on the first region, based on the execution of the second application.

13. The electronic device of claim 11, wherein the processor is further configured to:
execute a first application in response to the first input, and
output the first screen over the first region and the second region based on the execution of the first application.

14. The electronic device of claim 13, wherein the processor is further configured to:
execute a second application in response to the second input, when the second input is received,
drive the first region at the first driving frequency, while overlaying and outputting the second screen over the at least other portion of the first screen on the first region, based on the execution of the second application, and
change a driving frequency of the second region to the first driving frequency, while adjusting a size of the first screen and outputting the first screen on the second region.

15. An electronic device, comprising:
a display comprising a plurality of regions;
an extensible structure associated with extension of the display, wherein a first region of the plurality of regions includes at least a portion of a region which is observable before a display extension operation of the extensible structure, and wherein a second region of the plurality of regions includes at least a portion of a region which is expanded to be observable by the display extension operation of the extensible structure;
a display driver integrated circuit configured to drive the first region at a first driving frequency and drive the second region at a second driving frequency according to a configuration of the display; and
a processor configured to provide display data to the display driver integrated circuit,
wherein the processor is configured to:
identify a driving frequency of a first screen to be output on the display in response to reception of a first input, and
control the display to output at least a portion of the first screen on a region, of the plurality of regions, driven at a driving frequency corresponding to the driving frequency of the first screen.

16. The electronic device of claim 15,
wherein the extensible structure, and
wherein the display extension operation is a sliding operation of the sliding structure.

17. The electronic device of claim 15,
wherein the extensible structure is a rollable structure, and
wherein the display extension operation is a display rolling operation of the rollable structure.

* * * * *